United States Patent Office 2,829,126
Patented Apr. 1, 1958

2,829,126

RESINOUS COMPOSITIONS

Tzeng Jiueq Suen, New Canaan, and Yun Jen, Stamford, Conn., assignors to American Cyanamid Company, New York, N. Y., a corporation of Maine No Drawing. Application September 10, 1953
Serial No. 379,479

6 Claims. (260—69)

This invention relates to resinous compositions. More particularly, this invention relates to urea-formaldehyde-dicyandiamide condensation products, their method of production and products produced therefrom.

Various urea-formaldehyde resins are well known in the art. In many instances the urea-formaldehyde resin has been modified with other compounds to produce specific resinous materials. Inasmuch as each urea-formaldehyde condensation product or modified condensation product possesses unique properties, no resin known can be used in every application. Generally, the urea-formaldehyde materials previously produced possessed a high melting temperature above about 135° C. It has long been desired to obtain a urea-formaldehyde condensation product possessing a low melting temperature, so that molded objects produced therefrom could be pressed at a lower temperature with correspondingly lower pressures. It will readily be seen that a low melting point urea-formaldehyde condensation product would also find acceptance in other uses as, for example, adhesives, in the production of laminations, and in the treatment of paper, textiles, leather, and the like.

It is an object of our invention to produce a novel urea-formaldehyde-dicyandiamide condensation product. It is a further object of our invention to produce a novel urea-formaldehyde-dicyandiamide condensation product possessing a low melting temperature. These and other objects of our invention will be discussed more fully hereinbelow.

In the production of urea-formaldehyde resins and the various condensation resins thereof, it is customary to carry out the condensation to a point at which the condensate may be recovered by spray-drying, etc., as a powder. When used as a molding composition, the usual process is to introduce the resinous powder blended with other suitable ingredients into a mold maintained at elevated temperatures. The mold is then closed under pressure and the resinous material cured. When the melting or softening point of the resinous material has been reached, the resin flows and fills up the pattern of the mold. Inasmuch as the urea resinous composition known in the prior art possessed high melting points, increased temperatures were required during their cure. By the process of our invention, a urea-formaldehyde-dicyandiamide condensation product is obtained which possesses a low melting point. While the above discussion has been directed to the employment of the condensation product as a molding composition, the advantages realized therein, due to the low melting point of the product, may also be taken advantage of when the resinous composition is utilized in other applications wherein conventional urea resinous materials are employed.

In the process of our invention, certain critical steps must be followed in the production of the resinous material to attain the product possessing the desired properties. Initially, the urea and the formaldehyde are reacted at an elevated temperature and under alkaline conditions until methylol derivatives are produced. The temperatures utilized in the initial portion of our reaction may vary from about room temperature up to about the reflux temperature of the reaction mixture. Inasmuch as elevated temperatures increase the rate of production of the methylolated urea, it is preferred that temperatures of from about 65° C. up to the reflux temperature of the reaction mixture be used. The formation of the methylolated urea at elevated temperatures and under alkaline conditions takes place in a period of from about 15 to about 75 minutes. As previously stated, increased temperatures increase the reaction mixture. Therefore, the formation of the methylolated ureas is preferably carried out at an elevated temperature and in a period of from about 30 minutes to about 60 minutes. Various compounds may be employed to adjust the reaction mixture to alkaline conditions, such as sodium hydroxide, triethanolamine, and the like. After the methylolated urea is formed, the reaction mixture is then adjusted to a pH within the range of from about 3 to about 6.5 by a suitable acidic material, such as hydrochloric acid, formic acid, acetic acid, and the like. The reaction is then continued at a temperature ranging from about room temperature up to the reflux temperature of the mixture, preferably from about 65° C. up to the reflux temperature of the mixture until the mixture hydrophobes at a temperature varying from about 0° C. to about 70° C. The point at which the condensation product hydrophobes is easily determined by introducing a drop of the resinous syrup into a test tube half filled with water maintained at a particular temperature. If a white streak of the resinous material forms in the water, the condensation product is termed hydrophobic. The hydrophobe temperature of the first stage of the reaction, as above enumerated, must be reached before the second stage of the reaction is carried out. The preferred hydrophobe temperature of the first-stage reaction is from about 10° C. to about 50° C. After the condensation product hydrophobes in the first-stage reaction, the reaction mixture is then substantially neutralized and cooled to room temperature. Suitable compounds for substantially neutralizing the reaction mixture are such as those employed in adjusting the alkaline condition during the formation of the methylolated urea. When the reaction mixture has been substantially neutralized, a predetermined amount of dicyandiamide is then introduced into the reaction mixture and the reaction is then continued at temperatures ranging from about 45° C. up to the reflux temperature of the mixture. In order to shorten the reaction time in the second-stage reaction, it is preferred that a temperature from about 65° C. up to the reflux temperature of the mixture be employed. The second-stage reaction is carried out until the resinous syrup formed hydrophobes at a temperature of from about 50° C. up to about 90° C. It is obvious that the second-stage hydrophobe temperature must be higher than the first-stage hydrophobe temperature. Accordingly, it is preferred that the second-stage hydrophobe temperature be within the order of from about 60° C. to about 80° C. During the second-stage reaction, no pH adjustment of the reaction mixture is necessary inasmuch as the dicyandiamide present controls the pH of the reaction mixture.

In order that those skilled in the art may more fully understand the inventive concept herein presented, the following examples are given by way of illustration and not limitation unless otherwise noted in the appended claims. All parts are parts by weight.

*Example 1*

120 parts of urea and 340 parts of 37% aqueous formaldehyde were mixed together and pH of this solution brought to 7.6 with about 1 part of 50% triethanolamine. The reaction mixture was heated to 70° C. and kept at this temperature for 30 minutes. The pH was then adjusted to 4.7 with about 0.6 part of 9% hydrochloric acid. The reaction mixture was heated to reflux and refluxed for 11 minutes. It was cooled and neutralized to pH 7.0 with triethanolamine. The syrup showed a hydrophobe temperature of 45° C. 84 parts of dicyandiamide and 65 parts of 37% aqueous formaldehyde were then added. The reaction mass, the pH of which was 7.2, was reheated to about 80° C. and maintained at this temperature for about 80 minutes. A hydrophobe temperature of 60° C. was then reached. The product was cooled to room temperature; its pH was 7.8. A portion of the syrup was freeze-dried. The dried product had a melting point of about 84° C.

*Example 2*

30 pounds of urea, 85 pounds of 37% aqueous formaldehyde, and 113 cc. of 50% triethanolamine were mixed together. The pH of the mixture was 7.3. It was heated to 70° C. and maintained at 70–75° C. for 30 minutes. The pH of the solution was then lowered to 5.2 with 283 cc. of 10% acetic acid and reaction continued at reflux temperature for 52 minutes. The syrup reached a hydrophobe temperature of 34° C. After a slight cooling the pH was brought to 7.0 with 78 cc. of 20% sodium hydroxide solution. 21 pounds of dicyandiamide and 16.25 pounds of 37% aqueous formaldehyde were added. Reaction was continued at 90–95° C. until the hydrophobe temperature reached 80° C. The syrup was cooled and spray-dried. The dried product had a melting point of about 109° C.

*Example 3*

960 parts of urea and 2647 parts of 37% aqueous formaldehyde were mixed together and the pH brought to 7.4 with about 8 parts of 50% triethanolamine. The reaction mixture was heated to 70° C. and maintained at 70–75° C. for 30 minutes. The pH was then adjusted to 5.2 with about 19 parts of 10% acetic acid. The batch was heated to reflux and maintained at this temperature for about 45 minutes. The syrup reached a hydrophobe temperature of 35° C. It was neutralized to pH 6.9 with about 5 parts of 20% sodium hydroxide solution. 672 parts of dicyandiamide was added and reaction continued at 91–100° C. for about 75 minutes when a hydrophobe temperature of 81° C. was reached. The syrup, the pH of which was 7.8, was cooled and spray-dried. The dried product had a melting point of about 127° C.

*Example 4*

Example 3 was repeated except that only 2320 parts of 37% aqueous formaldehyde was used. The final hydrophobe temperature was 80–82° C. The dried product had a melting point of about 109° C.

If desired, the reaction mixture may be dried, e. g., by spray-drying, freeze drying, drum-drying, etc., to obtain a resinous powder. In the event a filled material is desired, any suitable organic or inorganic filler may be added to the syrup and the resulting material dried in any manner well known in the art, as, for example, continuous dryers. The filler may also be blended with the dried resinous powder, if desired. Suitable fillers such as talc, wood flour, alpha cellulose, cotton flock, Carborundum and the like, may be employed. Depending upon the ultimate use of the product will depend the amount of filler added. Therefore, amounts of fillers up to as much as 75% by weight, based on the weight of the resinous material, may be utilized. Dyes, pigments, and other additives may be introduced into the resinous material as desired.

In the formation of the resinous material of our invention, from about 0.2:1 to about 2.0:1 mols of dicyandiamide per mol of urea, respectively, is employed. The mols of formaldehyde to urea, respectively, may vary from about 1.4:1 to about 3.0:1. It is preferred, however, that the dicyandiamide to urea be within the range of from about 0.3:1 to about 1:1 mols, respectively, and the mols of formaldehyde to urea be within the range of from about 1.6:1 to about 2.5:1. During the formation of the resinous product of our invention, all of the urea is initially reacted with formaldehyde. All of the formaldehyde may be introduced into the reaction mixture with the urea, or, if desired, a portion of the formaldehyde may be introduced into the mixture at the time that the dicyandiamide is added. In either event, we are able to produce a urea-formaldehyde-dicyandiamide condensation product having a melting point within the range of from about 80° C. to about 130° C. When the formaldehyde is introduced into the reaction mixture in two portions, it is preferred that at least 60% of the total amount of the formaldehyde be initially reacted with the urea and the balance of the formaldehyde is then introduced with the predetermined amount of dicyandiamide into the reaction mixture.

We claim:

1. A process for preparing a resinous composition which comprises reacting urea with formaldehyde in an aqueous alkaline medium to produce methylolated urea, acidifying the reaction mixture to a pH between about 3 and about 6.5, further reacting the mixture until the condensation product hydrophobes at a first-stage temperature between about 0 and about 70 degrees centigrade, substantially neutralizing the reaction mixture, adding thereto between about 0.2 and about 2.0 mols of dicyandiamide per mol of urea charged, further reacting the resulting mixture until the product hydrophobes at a second-stage temperature higher than the first-stage hydrophobe temperature and between about 50 and about 90 degrees centigrade, wherein the total formaldehyde charged amounts to between about 1.4 and about 3.0 mols per mol of urea charged.

2. A process for preparing a resinous composition which comprises reacting urea with formaldehyde in an aqueous alkaline medium to produce methylolated urea, acidifying the reaction mixture to a pH between about 3 and about 6.5, further reacting the mixture until the condensation product hydrophobes at a first-stage temperature between about 10 and about 50 degrees centigrade, substantially neutralizing the reaction mixture, adding thereto between about 0.3 and about 1.0 mol of dicyandiamide per mol of urea charged, further reacting the resulting mixture until the product hydrophobes at a second-stage temperature higher than the first-stage hydrophobe temperature and between about 60 and about 80 degrees centigrade, wherein the total formaldehyde charged amounts to between about 1.6 and about 2.5 mols per mol of urea charged.

3. A process for preparing a resinous composition which comprises reacting urea with at least 60 percent of the total formaldehyde charged in an aqueous alkaline medium to produce methylolated urea, acidifying the reaction mixture to a pH between about 3 and about 6.5, further reacting the mixture until the condensation product hydrophobes at a first-stage temperature between about 0 and about 70 degrees centigrade, substantially neutralizing the reaction mixture, adding thereto between about 0.2 and about 2.0 mols of dicyandiamide per mol of urea charged and the balance of the formaldehyde, further reacting the resulting mixture until the product hydrophobes at a second-stage temperature higher than the first-stage hydrophobe temperature and between about 50 and about 90 degrees centigrade, wherein the total formaldehyde charged amounts to between about 1.4 and about 3.0 mols per mol of urea charged.

4. A process for preparing a resinous composition which comprises reacting urea with at least 60 percent of the total formaldehyde charged in an aqueous alkaline medium to produce methylolated urea, acidifying the reaction mixture to a pH between about 3 and about 6.5, further reacting the mixture until the condensation product hydrophobes at a first-stage temperature between about 10 and about 50 degrees centigrade, substantially neutralizing the reaction mixture, adding thereto between about 0.3 and about 1.0 mol of dicyandiamide per mol of urea charged and the balance of the formaldehyde, further reacting the resulting mixture until the product hydrophobes at a second-stage temperature higher than the first-stage hydrophobe temperature and between about 60 and about 80 degrees centigrade, wherein the total formaldehyde charged amounts to between about 1.6 and about 2.5 mols per mole of urea charged.

5. A resinous composition which comprises a thermosetting urea-dicyandiamide-formaldehyde condensate prepared according to the process of claim 1 with a melting point between about 80 and about 130 degrees centigrade.

6. A resinous composition which comprises a thermosetting urea-dicyandiamide-formaldehyde condensate prepared according to the process of claim 2 with a melting point between about 80 and about 127 degrees centigrade.

References Cited in the file of this patent

UNITED STATES PATENTS

| | | |
|---|---|---|
| 2,554,475 | Suen et al. | May 22, 1951 |
| 2,711,961 | Bruner | June 28, 1955 |

FOREIGN PATENTS

| | | |
|---|---|---|
| 287,177 | Great Britain | June 17, 1929 |